United States Patent [19]

Smith

[11] Patent Number: 5,205,604
[45] Date of Patent: Apr. 27, 1993

[54] LOW PROFILE VISOR ASSEMBLY

[75] Inventor: Nels R. Smith, Holland, Mich.
[73] Assignee: Prince Corporation, Holland, Mich.
[21] Appl. No.: 810,834
[22] Filed: Dec. 20, 1991
[51] Int. Cl.$^5$ ............................................. B60J 3/02
[52] U.S. Cl. .................................. 296/97.11; 296/971
[58] Field of Search .................. 296/97.1, 97.4, 97.5, 296/97.7–97.9, 97.11, 97.12, 214

[56] References Cited

U.S. PATENT DOCUMENTS

| Re. 24,706 | 9/1959 | McCormick | 296/97.11 |
|---|---|---|---|
| 2,289,644 | 4/1941 | Gano, Jr. | 296/97.11 X |
| 2,444,524 | 7/1948 | Parrish, Jr. | 296/97.11 |
| 2,559,471 | 7/1951 | Schrock | 296/97.11 |
| 2,894,576 | 7/1959 | Williams | 160/220 |
| 3,008,758 | 11/1961 | McCormick | 296/97.11 |
| 3,403,937 | 10/1968 | Quaine | 296/97.11 |
| 4,904,013 | 2/1990 | Canadas | 296/97.4 |
| 4,929,014 | 5/1990 | Clark et al. | 296/97.8 |
| 4,979,775 | 12/1990 | Klose | 296/97.1 |
| 4,988,139 | 1/1991 | Yamada | 296/97.11 X |
| 4,989,910 | 2/1991 | Mersman et al. | 296/97.4 |
| 5,000,506 | 3/1991 | Abu-Shumays et al. | 296/97.8 |
| 5,004,288 | 4/1991 | Viertel et al. | 296/97.11 |
| 5,031,952 | 7/1991 | Miyamoto et al. | 296/97.11 X |
| 5,040,839 | 8/1991 | Moore | 296/97.8 X |

FOREIGN PATENT DOCUMENTS

| 2806986 | 8/1979 | Fed. Rep. of Germany | 296/97.8 |
|---|---|---|---|
| 315321 | 12/1988 | Japan | 296/97.8 |
| 567958 | 3/1945 | United Kingdom | 296/97.11 |
| 874658 | 8/1961 | United Kingdom | 296/97.11 |
| 1102089 | 2/1968 | United Kingdom | 296/97.11 |

Primary Examiner—Dennis H. Pedder
Attorney, Agent, or Firm—Price, Heneveld, Cooper, DeWitt & Litton

[57] ABSTRACT

A movable visor assembly for a vehicle including a slotted support track for attachment to a supporting surface in the vehicle. The slot in the support track includes opposed visor guide surfaces and a channel in at least one of the guide surfaces. The visor blade has an aperture near each end of one side into which an alignment member, such as a ball bearing, can be mounted. The edge of the visor blade, including the alignment member, is slidably mounted in the slot in the support track with the alignment members in the channel. The alignment members enable the visor blade to slide freely in the support track without binding, even if the support track is flexed and twisted as installed in the vehicle.

14 Claims, 3 Drawing Sheets

LOW PROFILE VISOR ASSEMBLY

BACKGROUND OF THE INVENTION

In today's automobile styling there is a tendency to reduce the height and streamline the body of the automobile to reduce wind drag and, in turn, increase the performance and fuel economy. As the roof of the automobile lowers, the amount of room inside for passengers decreases.

It is common practice at the present time to mount the sun visor above the windshield on the driver and passenger sides on an L-shaped pivot rod with one end projecting from a fixture fastened to the overhead of the vehicle. In use, the visor can be pivoted down around the rod in front of the face of the driver or passenger and placed over a portion of the windshield. If sunlight is coming in from the side of the vehicle, the pivot rod can be swung around to the side and the visor lowered to block out the light. In order to make either of the above adjustments, the driver and passenger have to move their heads clear of the visor. If the driver is making this adjustment at high speed, a potential for an accident is presented. The operation of the visor would be substantially improved if the visor were positioned in the vehicle so that it could be adjustably brought down to block out the objectionable sunlight without the driver or passenger having to move their heads out of the way of the visor blade. Also, the overhead area in a vehicle would be substantially increased if the conventional sun visor and pivot rod were removed.

SUMMARY OF THE INVENTION

In accordance with the present invention, a low profile sun visor is provided which is attached to the A-pillar on each side of the vehicle. A track is provided which can be concealed behind decorative material revealing only a slot in which the sun visor moves. The visor track can be attached to the A-pillar and to the overhead in the vehicle and can be bent and twisted to conform to the supporting structure. When not in use, the sun visor can be slid along the track up into the overhead of the vehicle above the headliner. When it is desired to use the sun visor, it can be adjustably pulled down from the space above the headliner to the extent needed to shield the eyes from the glare of the sun. A second sun visor can also be attached to the A-pillar on a similar track so that the sun visor can project along a side window of the vehicle. Again, when the visor is not in use, it can be stored above the headliner and, when needed, adjustably drawn downwardly in the track to the extent needed to comfortably protect the eyes of the passenger or driver of the vehicle.

Essentially, a low profile visor for a vehicle is provided which has a support track attached to a portion of the body structure. The track has a longitudinal slot in one edge with the opposed sides of the edge forming guide surfaces for the visor. A longitudinal channel is provided in at least one of the guide surfaces to receive a visor alignment member.

A visor blade is provided for covering a portion of the window through which excessive light passes. The visor has an aperture near each end of a common edge. An alignment member, preferably a ball, is inserted into each aperture in the visor. The edge of the visor, including the alignment member, is inserted into the slot in the visor track with the alignment balls in the channel in the guide surface. The visor is free to slide in the support track which can be extended along a window edge and up above the headliner of the vehicle. The visor can be stored substantially out of sight and can then be adjustably slid down to the optimum position to shield excessive light from the eyes of the driver or passenger.

DETAILED DESCRIPTION OF THE PREFERRED EMBODIMENTS

Figure 1:
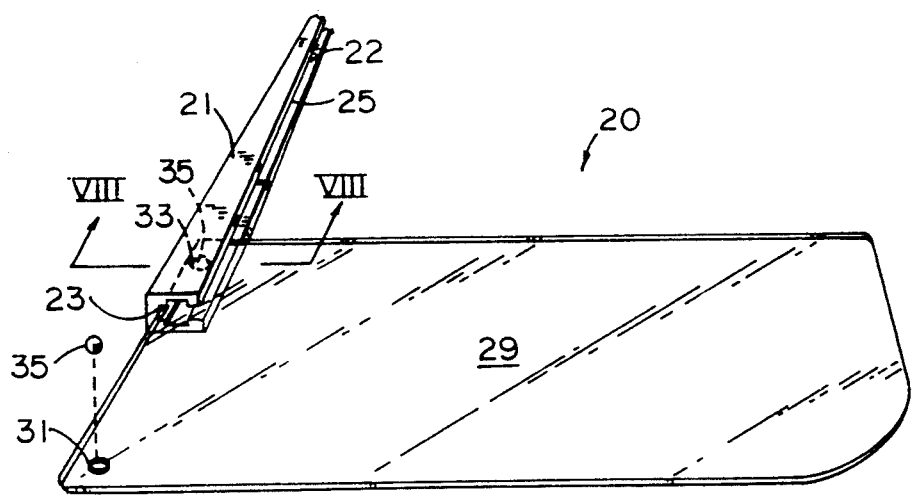
FIG. 1 is a partially exploded, schematic view of a visor in a support track.

Referring to FIG. 1, the basic visor assembly is shown and indicated generally by the number 20. The visor assembly has a support track 21 which has a longitudinal slot 22 therein bounded by a pair of guide surfaces 23 and 25. A longitudinal channel 27 is located in guide surface 23.

A visor blade 29 is mounted in slot 22 in support track 21. Apertures 31 and 33 are stamped or die cut into opposite corners of a common edge of visor blade 29. An alignment member 35, preferably a ball bearing, is loosely fit into each of the apertures 31 and 33. The visor blade 29, along with ball bearings 35, are inserted into elongated slot 22 in support track 21 with the ball bearings being free to roll in channel 27 as visor blade 29 moves in slot 22.

Figure 4:
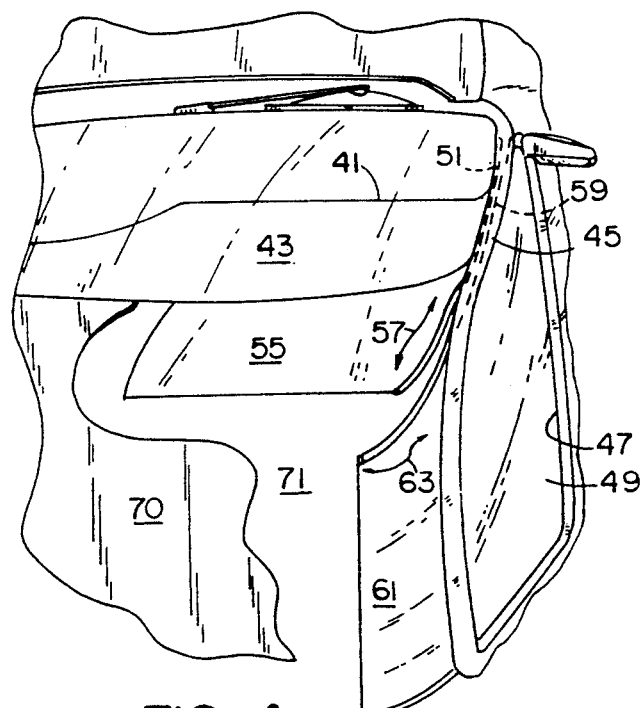
FIG. 4 is a top plan view, with the roof of the vehicle removed, showing the visors of FIGS. 3 and 4 in the stored position.
Figure 5:
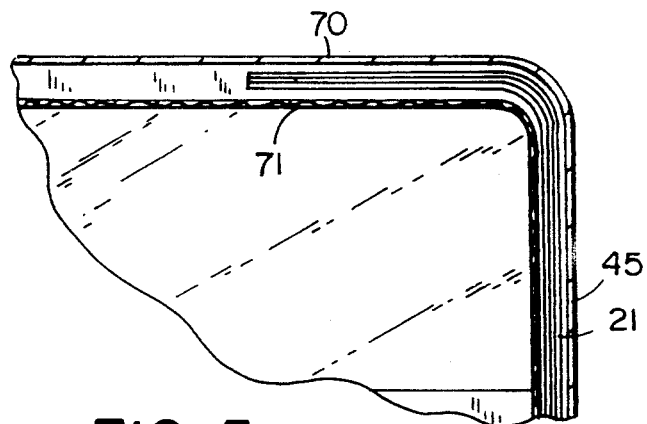
FIG. 5 shows a support track attached to an A-pillar and extending upwardly to the visor storage portion between the headliner and roof of the vehicle.

Support track 21 can be made of metal or plastic and is preferably formed through an extrusion process. The support track can easily be bent to conform to the configuration of the vehicle. For example, in mounting the support track on either A-pillar at the front of a vehicle, the support track can be mounted to the A-pillar and then extended up under the roof of the automobile and above the decorative headliner, as shown in FIGS. 3-5.

Visor blade 29 can be shaped to cover the necessary portion of the windshield or side window. The blade can be made of metal but is preferably made of plastic material. The plastic material can be tinted, polarized or opaque. Regardless of the material used to make the visor blade, it should be thick enough to be dimensionally stable so that it can maintain its position adjacent the window it is intended to cover.

Figure 3:
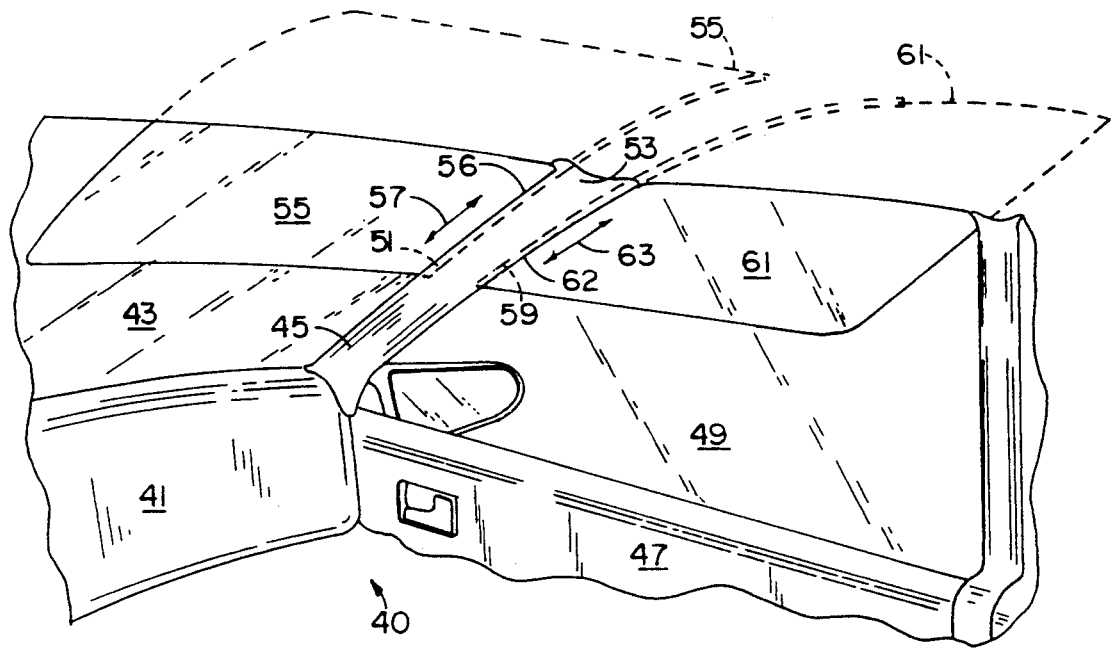
FIG. 3 is a perspective view showing two support tracks attached to an A-pillar for a visor for the windshield and for a visor covering a side window.

In FIG. 3, a portion of an automobile 40 is shown including a dashboard 41, a windshield 43, an A-pillar 45, a door 47 and a side window 49. The A-pillar 45 has a track 51 which is concealed beneath the decorative material 53 which covers the A-pillar. A visor blade 55 is supported in track 51 and extends through a slot 56 in the material 53. The visor blade is adapted to adjustably move, as indicated by the bi-directional arrow 57, from the use position shown to a concealed position, indicated in phantom, which is above the headliner of the vehicle and below the roof. A similar concealed track 59 is also attached to the A-pillar 45. A visor blade 61 is supported in track 59 and extends through a slot 62 in material 53. The visor blade is adapted to adjustably slide from a use position, covering a portion of a side window 49, to a stored position, shown in phantom, which would be above the headliner of the vehicle and below the roof. The adjustable movement of visor blade 61 is indicated by the bi-directional arrow 63.

In view of the sharp slope of A-pillar 45, and since the visor blades are only intended to cover the portion of windshield 43 and side window 49, through which objectionable sunlight would pass, visor blades 55 and 61 are not as large as the entire window they are intended to cover. Each visor blade only has to be large enough to cover the portion through which the objectionable light would pass. In view of the reduced size of the visor blades, the visor blades can be stored above the headliner and below the roof without overlapping. It is clearly within the scope of the present invention to have the visor blades overlap.

In FIG. 4, visors 55 and 61 are shown supported in an overhead portion of the vehicle by guide support tracks 51 and 59. It can be seen that both visors are substantially out of view of the occupants of the vehicle and can be raised and lowered by merely grasping an edge portion of the visor blade.

As mentioned above, visor support track 21 is preferably made through a metal or plastic extrusion process and can be shaped to conform to the configuration of the A-pillar of the vehicle and the roof line. The visor blade material is flexible and, through the use of alignment members 35, the visor blade will smoothly conform to the turns and twists in the visor support track. As shown in FIG. 5, visor support track 21 can extend along A-pillar 45 of the vehicle and then smoothly bend under the roof of the vehicle 70 and above the headliner 71 of the vehicle so that the visor blade can be substantially removed from sight to a position where the head room in the vehicle is not interfered with.

Figure 2:
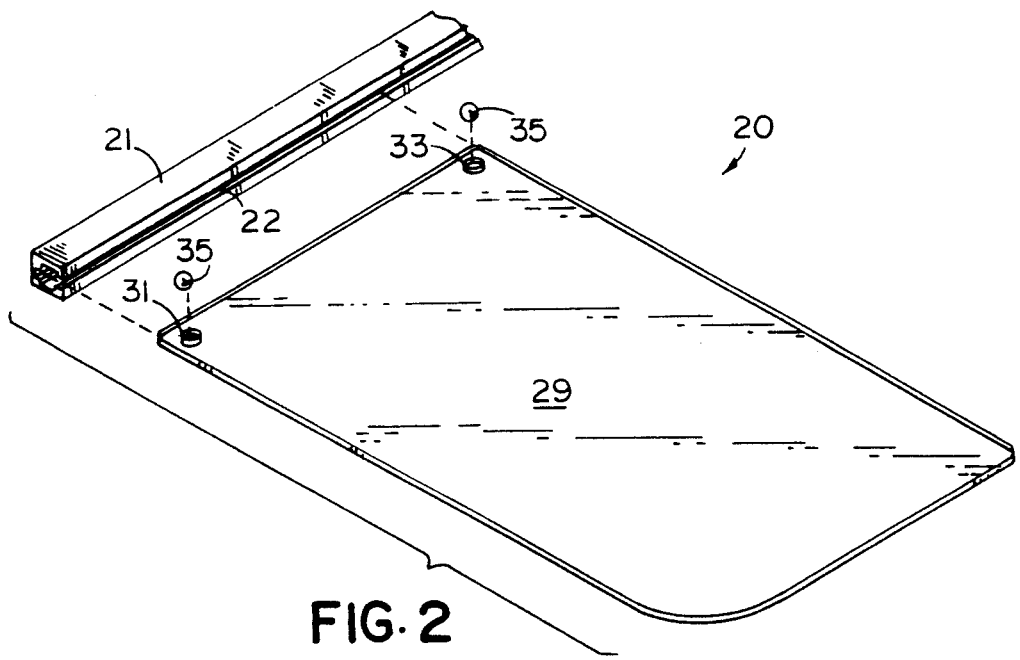
FIG. 2 is an exploded view of a support track, a visor blade and guide members for the visor.
Figure 6:
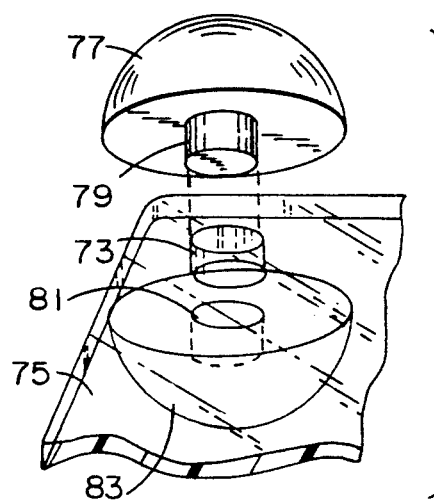
FIG. 6 is a fragmentary, exploded view showing an alignment member that can be snapped together through the corner aperture in the visor.

While in FIGS. 1 and 2 the preferred visor alignment member is shown to be a ball bearing 35, it is within the scope of the present invention to use other alignment member configurations. Referring to FIG. 6, a plastic alignment member is shown which can be fixed in an aperture 73 which extends through a corner portion of a visor 75. The alignment member has an upper part 77 which has a substantially centrally disposed projection 79 which can be press-fitted into a blind hole 81 formed in the abutting surface of a second half of the alignment member 83. In use, the two halves of alignment member 77 and 83 can be press-fitted together in the corner of visor blade 75. The plastic alignment member can be made of a material such as Nylon or Teflon, which are lubricious materials which can easily slide in the guide channel in the visor support track.

Figure 7:
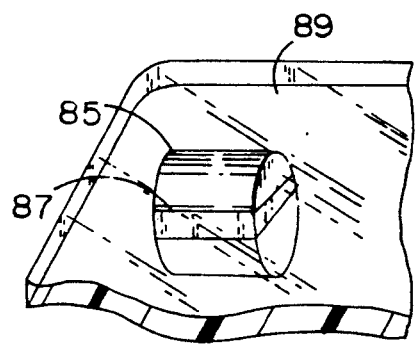
FIG. 7 is a fragmentary view of a corner of a visor showing a roller in place in the visor aperture.

In FIG. 7, the alignment member 85 is in the form of a roller. The roller is inserted into a substantially rectangular aperture 87 in a corner of the visor blade 89. The rectangular aperture maintains the alignment of the roller preventing it from cocking or locking rather than rolling smoothly in the guide channel in the visor support track. Roller 85 can be made of metal or plastic.

Figure 8:
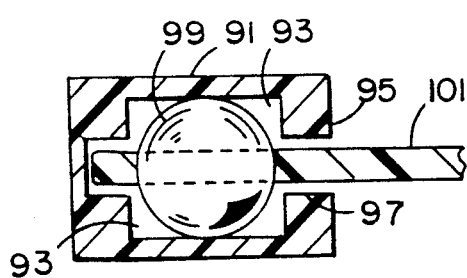
FIG. 8 is a sectional view of a support track having a channel in each guide surface and with a visor and guide member in position.

In FIG. 8, a visor guide track 91 is shown having an alignment channel 93 formed in both the upper and lower guide surfaces 95 and 97, respectively. An alignment member in the form of a ball bearing 99 is positioned in the guide channel in an aperture in a visor blade 101. As mentioned above, a pair of alignment members would be used along one edge of the visor blade. The number of alignment members can be increased as desired. At least two are preferred near remote corners along a common edge of the visor blade.

Figure 9:
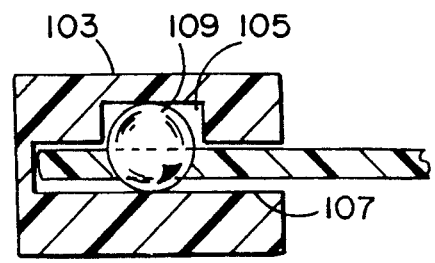
FIG. 9 is a sectional view of a second embodiment of the support track showing a channel for the guide member in one guide surface.

Now referring to FIG. 9, a visor guide track 103 is shown with a single guide channel 105 formed in one guide surface 107. An alignment member in the form of a ball bearing 109 is confined within guide channel 105 and can freely roll along guide surface 107. While substantially rectangular guide channels have been shown in the visor track, it is within the scope of the present invention to use other channel configurations. For example, arcuate or abutting angled surfaces forming a substantially V-shaped channel can also be used. The guide channel and alignment members provide for easy movement of the visor blade in the support track with the visor blade being stiffened by the guide surfaces adjacent the alignment channel. The visor blade is then free to move in the visor support track while being maintained in alignment with the edge of the visor blade reinforced by the guiding surfaces on either side of the longitudinal slot in the guide track.

From the above description it can be seen that a low profile visor is provided for use in a vehicle which can be substantially completely removed from sight of the driver and passengers of the vehicle and which can easily be grasped and adjustably slid down over the windshield or side window to provide protection from objectionable sunlight. The low profile visor assembly also removes the pivot rod and its support bracket providing more head room for the occupants of the vehicle. The low profile visor also provides unlimited adjustability in the amount of windshield or side window being covered rather than the substantially all or nothing provided by the conventional visor assembly.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A low profile visor for a vehicle comprising:
  a support track for attachment to a supporting pillar surface in said vehicle, said support track having a longitudinal slot in one edge thereof including opposed longitudinal guide surfaces on each side of said slot and at least one longitudinal channel in one of said guide surfaces, said longitudinal slot extending along the edge portion of a window to be covered by said visor;
  a visor blade having an aperture therein near each end of an edge thereof, said visor blade edge extending into said slot; and
  an alignment member mounted in each aperture in said visor blade, said edge of said visor blade including said alignment members being mounted in said slot in said support track with said alignment members mounted in said channel in said slot in said support track, said alignment member extending on opposite sides of said visor blade to engage said opposed guide surfaces including said at least one channel.

2. A low profile visor as set forth in claim 1, wherein said support surface in said vehicle is the A-pillar of said vehicle.

3. A low profile visor as set forth in claim 1, wherein said visor is made of transparent material.

4. A low profile visor as set forth in claim 1, wherein said visor is made of opaque material.

5. A low profile visor as set forth in claim 1, wherein said support track has an opposed longitudinal channel in each of said opposed guide surfaces in said slot.

6. A low profile visor as set forth in claim 1, wherein said alignment members can rotate in said channel in said support track when said visor blade is moved.

7. A low profile visor as set forth in claim 1, wherein said alignment members are ball bearings.

8. A low profile visor as set forth in claim 1, wherein said alignment members have shaped surfaces for sliding in said channel in said support track.

9. A low profile visor as set forth in claim 1, wherein said support track is flexible.

10. A low profile visor as set forth in claim 1, wherein said support track can be shaped to conform to said supporting pillar surface in said vehicle.

11. An A-pillar supported visor comprising:
a visor support track for attachment to said A-pillar along and adjacent to the edge of a portion of a window to be covered, said visor support track comprising an elongated member having a longitudinal slot in a surface for alignment with the vehicle window to be adjustably covered by said visor, said slot including a pair of opposed guide surfaces and at least one channel disposed in a guide surface;
a visor blade for covering said vehicle window, said visor blade having an aperture near each end of an edge thereof, said visor blade edge extending into said slot; and
an alignment member positioned in each aperture in said visor blade with said alignment members extending on opposite sides of said visor blade to engage said opposed guide surfaces including said at least one channel, said visor blade including said alignment members being movably positioned in said slot in said visor support track with said alignment members positioned in said channel.

12. An A-pillar supported visor as set forth in claim 11, wherein said visor support track extends along said A-pillar and above the headliner of said vehicle, said visor blade being stored above the headliner when not in use and adjustably slid down the visor support track to cover said vehicle window.

13. An A-pillar supported visor as set forth in claim 11, wherein a pair of said visor support tracks are mounted on said A-pillar for supporting separate visor blades for adjustably covering a side window and a portion of the windshield of said vehicle.

14. An A-pillar supported visor as set forth in claim 13, wherein said separate visor blades can be stored above the headliner of said vehicle in said pair of visor support tracks.

* * * * *